Patented Apr. 21, 1942

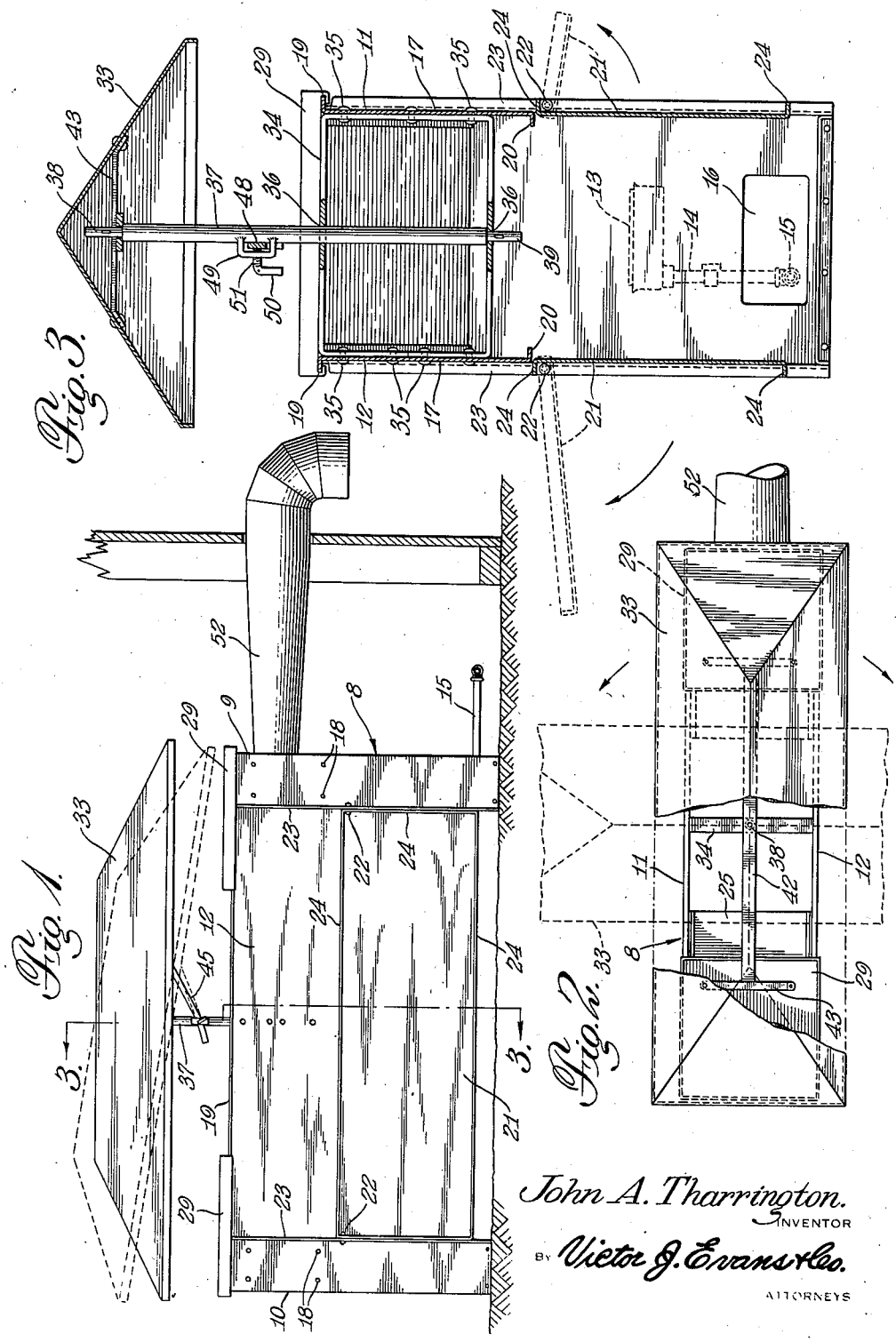

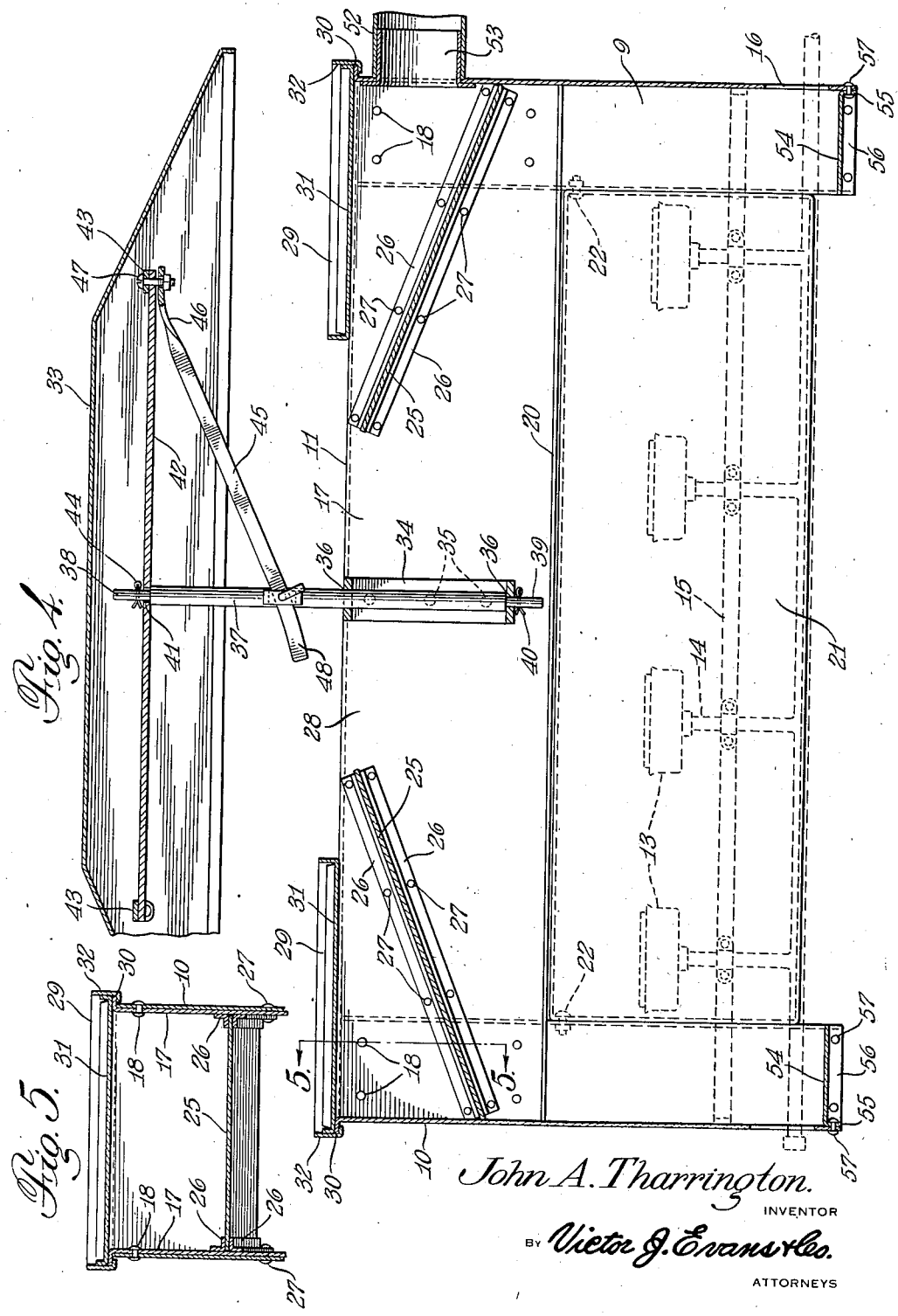

2,280,458

UNITED STATES PATENT OFFICE 2,280,458

HEATING DEVICE FOR TOBACCO CURING BARNS

John A. Tharrington, Rocky Mount, N. C.

Application March 31, 1939, Serial No. 265,293

4 Claims. (Cl. 263—19)

The present invention relates to a new and improved heating device for tobacco curing barns.

The primary object of the invention resides in the provision of a heater having means for controlling the distribution of heat from the heating unit to the tobacco being cured in the barn.

A further object of the invention resides in the provision of a heating unit, the body of which is preferably formed of light gauge sheet metal and having a multiplicity of liquid fuel burners supported therein. A hood is disposed above the unit and is attached thereto in a manner so as to be readily adjustable for controlling the distribution of air from said unit.

A still further object of the invention resides in the provision of a heater having the above mentioned characteristics which further includes deflector plates supported in spaced relation above the burners for confining the heated air which passes beneath the swingably mounted hood.

Another object of the invention resides in the provision of a heater having means for admitting air from outside of a tobacco barn which is carried through a suitable pipe into the heated walls of the unit, said air being heated beneath the hood as it passes over the flames and is then released into the barn thus providing a superior drying process.

Another object of the invention comprises the use of a water pan supported above the deflector plates and heated thereby for providing the required amount of moisture necessary at the yellowing period of tobacco curing. The water pan and deflecting walls are removably supported in the body of the heating unit.

The invention will be fully and comprehensively understood from a consideration of the following detailed description when read in connection with the accompanying drawings which form a part of the application.

In the drawings:

Figure 1 is a side elevational view of a heating unit embodying the features of the present invention.

Figure 2 is a top plan view thereof with parts broken away.

Figure 3 is a vertical sectional view taken substantially on line 3—3 of Figure 1.

Figure 4 is an enlarged transverse sectional view of the new and improved heating unit, and Figure 5 is a detail sectional view taken substantially on line 5—5 of Figure 4.

In the curing of tobacco it has been found advisable to employ a multiplicity of heating units positioned at selected places within the barn, so that the heat derived therefrom will be most advantageous for the curing of tobacco. The heating unit to be hereinafter described is adapted to be placed in tobacco curing barns with a plurality of such units positioned at selected places within the barn and when so positioned each unit will be selectively adjustable for assuring and maintaining the correct distribution of heated air for proper curing of the tobacco.

Referring to the drawings for a more detailed description thereof, it will be noted that the heating device generally designated by the numeral 8 is a substantially rectangular-shaped housing and comprises end walls 9 and 10, respectively, and side walls 11 and 12, respectively, said walls being preferably formed of light gauge sheet metal. Within the heating device there is supported a plurality of oil burners 13 of a conventional construction, said burners being connected through the vertical portions 14 with the oil supply pipe 15. Each end wall is formed with an opening 16 for supplying the required amount of air to maintain proper operation of the burner.

The end walls 9 and 10 are substantially U-shaped with the sides of the U-section bolted or otherwise secured to the side walls 11 and 12 of the housing. The side walls 11 and 12 comprise upper and lower sections with the lower section being hingedly connected to the end walls to prevent cold air striking the hot burners thereby causing them to flicker and oftentimes be extinguished. The hingedly mounted lower section of the side walls also permits ready access to the burners for igniting the same or for making necessary repairs. Referring more particularly to Figures 1 and 4 of the drawings, it will be noted that the upper section of the side wall 11 designated by the numeral 17, is disposed between the end walls 9 and 10 and is held in abutting relation thereto being bolted or otherwise secured as indicated at 18. A like construction is provided for the upper section of the other side wall 12 and by referring to Figure 3 of the drawings, it will be noted that the upper end 19 of the section 17 is flanged outwardly with the lower end 20 thereof flanged inwardly, said flanges being provided for adding rigidity to the structure of the device.

As afore indicated the lower sections 21 of the side walls are swingably mounted and by referring to Figure 3 of the drawings it will be noted that said sections are pivoted at 22 to the flange 23 forming a part of the U-section of the end walls 9 and 10, the upper and lower ends of the swingable sections 21 being flanged outwardly as indicated at 24. By the arrangement of the flanges 20 and 24, respectively, the sections 21 are adapted to swing in the direction of the arrows without binding against the upper sections 17.

A pair of angularly disposed deflector plates 25 are supported above the burners 13, said plates being supported between a pair of angle-shaped brackets 26 bolted or otherwise secured as indicated at 27 to the upper section of the side walls 11 and 12. The angle brackets 26 form guideways for slidably receiving the plates 25, it being understood that said plates extend across the entire width as more clearly shown in Figure 5 of the drawings. Provision of the plates 25 forms a restricted space 28 through which the heated air is discharged, it being understood that said plates are appropriately heated by the burners.

Slidably supported on each end of the unit are a pair of water pans 29 the water therein being heated by convected heat from the deflector plates for moistening the air which is necessary at the yellowing period of tobacco curing. The pans 29 are slidably disposed over the outwardly extending flanges 30 formed on the upper end of the end walls 9 and 10, respectively. Each pan 29 comprises a bottom wall 31 welded or otherwise secured to the side walls 32, said bottom wall being disposed between the side walls in a manner to provide a space for receiving the flange 30 as more clearly shown in Figure 5 of the drawings.

Supported above the top edge of the device is a hood 33, said hood being rotatable and swingable for controlling the distribution of heat from the burners. Referring more particularly to Figures 3 and 4 of the drawings, it will be noted that a substantially rectangular-shaped bracket 34 is disposed between the upper sections 17 and riveted or otherwise secured thereto as indicated at 35, said bracket being preferably positioned in substantially the central portion of the device. A pair of aligned openings 36 are formed in the upper and lower portions of said bracket for receiving the vertically disposed shaft 37 which supports the hood or cover 33. The upper and lower ends of the shaft 37 are reduced in diameter as indicated at 38 and 39, with the lower reduced end 39 being held in the bracket 34 through the medium of a cotter pin or the like 40. The upper reduced end 38 is disposed through an opening 41 formed in a transversely disposed bracket 42, said bracket being welded or otherwise secured at each end to the cross braces 43. For retaining the shaft 37 in locked engagement with the brace 42, there is employed a cotter pin or the like 44. By this construction it will be readily apparent that the hood 33 is keyed to the shaft 37 and that said shaft is rotatably supported within the bracket 34.

It may be desirable to tilt the hood 33 a slight degree to direct the heated currents of air from the housing and for accomplishing the same there is provided a strap-like member 45 one end of which is twisted as indicated at 46 for abutting relation with the transverse brace 42 and is loosely held thereto by means of the bolt and nut 47. The other end 48 of the member 45 is disposed through a C-shaped bracket 49 welded or otherwise secured to the shaft 37. For retaining the member 45 in clamped position there is provided an L-shaped member 50 having one end 51 threaded for insertion in a threaded opening formed in the clamp 49. Rotation of the member 50 causes the same to engage the strap end 48 and to lock the same against the shaft 37. When desiring to change the angularity of the hood 33 the locking member 50 is released and the strap member 45 moved upwardly or downwardly depending upon the desired angularity of the cover, one tilting position being shown in dot and dash lines in Figure 1 of the drawings. When the proper angularity of the cover has been obtained the member 50 is then rotated into position for clamping the strap member 45 against the shaft 37 as afore indicated.

Cold air from outside the barn is admitted to the heating unit through the pipe 52, said pipe being connected with a suitable coupling 53 disposed through the upper end of the end wall 9 and the admitted air flows between the water pan 29 and baffle plate 25 by a suction created by the upward flow of air from the burners 13 through the space 28. The incoming air will mix with the heated air beneath the hood or cover 33 and become further heated as it passes over the flames of the burners 13. The incoming heated air passes out beneath the cover 33 into the barn thereby providing an improved drying process.

The bottom end of the end walls 9 and 10 is closed by means of a plate 54 having a flanged portion 55 and 56 through which the attaching rivets 57 are disposed. It is, of course, to be understood that a certain amount of air will be admitted to the burners 13 beneath the flanged portion 24 of the lower swingable sections 21 which will materially assist in the function and operation of the burners.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. In a heater including side and end walls forming an enclosure, a hood for said enclosure, means for supporting said hood in spaced relation above said enclosure, said means including a substantially square-shaped bracket secured between said side walls, a shaft disposed through said bracket and having one end secured thereto, a transverse brace attached to said hood, the upper end of said shaft connected to said transverse brace, and means extending from said brace having engagement with said shaft for adjusting said hood.

2. In a heater including side and end walls forming an enclosure, a hood for said enclosure, means for supporting said hood in spaced relation above said enclosure, said means including a substantially square-shaped bracket secured between said side walls, a shaft disposed through said bracket and having one end secured thereto, a transverse brace attached to said hood, the upper end of said shaft connected to said transverse brace, means extending from said brace having engagement with said shaft for adjusting said hood, said means including a strap-like member having one end attached to said brace, the other end of said strap-like member extending through a C-shaped bracket secured to said shaft, and means carried by said C-shaped bracket for clamping said strap-like member therein.

3. In a heater for tobacco curing barns including a housing having side and end walls and a plurality of burners supported therein, a hood above said housing for directing heated air therefrom, means for supporting said hood for universal movement in spaced relation above said housing, said means including a substantially rectangular-shaped bracket attached to opposed side walls of said housing, a shaft mounted for rotation within said bracket, a transverse brace attached to said hood, the upper end of said shaft attached to said brace, and means extending from said brace having engagement with said shaft for effecting longitudinal adjustment of said hood.

4. In a heater for tobacco curing barns including an enclosure having side and end walls and a plurality of burners supported therein, a hood above said enclosure for directing heated air therefrom through the barn, means for supporting said hood for universal movement in spaced relation above said enclosure, said means including a substantially square-shaped bracket attached to opposed side walls of said enclosure, a shaft mounted for rotation within said bracket and held substantially centrally of said enclosure, a transverse brace attached to said hood, the upper end of said shaft connected to said brace, means extending from said brace having engagement with said shaft for adjusting said hood, said means including a strap-like member having one end attached to said brace with the other end thereof extending through a C-shaped bracket carried by said shaft, and means on said C-shaped bracket for clamping said strap-like member therein.

JOHN A. THARRINGTON.